(12) United States Patent
Fogarty et al.

(10) Patent No.: US 8,754,615 B2
(45) Date of Patent: Jun. 17, 2014

(54) CONVERSION OF SYNCHRONOUS GENERATOR TO SYNCHRONOUS CONDENSER

(75) Inventors: James Michael Fogarty, Schenectady, NY (US); Gary Edward Gottung, Clifton Park, NY (US); David Mark Stuebner, Delanson, NY (US)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 13/150,726

(22) Filed: Jun. 1, 2011

(65) Prior Publication Data

US 2012/0306458 A1 Dec. 6, 2012

(51) Int. Cl.
*H02H 7/06* (2006.01)
*H02P 9/00* (2006.01)

(52) U.S. Cl.
USPC ............................................. 322/32; 322/17

(58) Field of Classification Search
USPC ...................................................... 322/17, 44
See application file for complete search history.

(56) References Cited

U.S. PATENT DOCUMENTS

| 5,610,500 | A | 3/1997 | Giberson | |
|---|---|---|---|---|
| 6,140,803 | A | 10/2000 | Hurley et al. | |
| 6,333,622 | B1 | 12/2001 | Fogarty et al. | |
| 6,504,261 | B2 | 1/2003 | Fogarty et al. | |
| 6,960,900 | B2 | 11/2005 | Fogarty et al. | |
| 2001/0054823 | A1* | 12/2001 | Fogarty et al. | 290/31 |
| 2004/0184292 | A1* | 9/2004 | Knox | 363/58 |
| 2005/0012397 | A1 | 1/2005 | Weeber et al. | |
| 2009/0096212 | A1 | 4/2009 | Turner et al. | |

\* cited by examiner

*Primary Examiner* — Tulsidas C Patel
*Assistant Examiner* — Thomas Quigley
(74) *Attorney, Agent, or Firm* — Ernest G. Cusick; Hoffman Warnick LLC (57) ABSTRACT

An approach for converting a synchronous generator to a synchronous condenser is disclosed. In one aspect, a variable frequency driver is used to provide a starting power source to accelerate a synchronous generator decoupled from a turbine to an operational speed to act as a synchronous condenser. In another aspect, the synchronous condenser can be recoupled back to the turbine to form the synchronous generator.

20 Claims, 6 Drawing Sheets

CONVERSION OF SYNCHRONOUS GENERATOR TO SYNCHRONOUS CONDENSER

BACKGROUND OF THE INVENTION

The present invention relates generally to synchronous machines and more particularly to converting a synchronous generator to a synchronous condenser.

Synchronous generators driven by turbines are commonly used by power utilities to produce electrical energy. Often after many years of use, power utilities will retire or decommission synchronous generators from use as power generation units. In some cases, it is desirable to use these retired synchronous generators as synchronous condensers to generate reactive power or absorb reactive power. As a general proposition, a retired synchronous generator needs to be decoupled from the turbine that drove it when being used as a synchronous condenser. In order for the decoupled generator to be used as a synchronous condenser, it needs to be brought to operational speed. Typically, dedicated means such as a starting motor attached to the shaft of the rotor of the generator is used to bring the generator up to operational speed. Assembling the starting motor to the rotor can be time consuming. In addition, the starting motor needs to be designed to withstand any operational event (e.g., electrical faults in the motor or synchronous condenser, overspeed events, shaft failures, and general malfunctions) that a normal motor might experience even though it will be in service for only a short time period.

BRIEF DESCRIPTION OF THE INVENTION

In one aspect of the present invention, a synchronous condenser is provided. The synchronous condenser comprises a synchronous generator decoupled from a turbine. The generator has a rotor and a rotor shaft mounted within a stator. The rotor shaft has a first end decoupled from the turbine and a second end opposite the first end. A variable frequency drive, coupled to the generator, provides electrical energy to the stator to turn the rotor at a rotational speed that is proportional to a frequency of operation of the variable frequency drive. An exciter facilitates injection of excitation current into the generator rotor at any speed of rotation including standstill. A controller, operatively coupled to the variable frequency drive and the exciter, controls acceleration of the rotor to an operational speed enabling the generator to perform a synchronous condenser operation.

In a second aspect of the present invention, a system for generating a synchronous condenser operation is disclosed. In this aspect of the present invention, the system comprises: more than one generator each decoupled from a turbine, each generator having a rotor and a rotor shaft mounted with a stator, the rotor shaft having a first end decoupled from the turbine and a second end opposite the first end; at least one variable frequency drive coupled to the more than one generator to provide electrical energy to the stator that turns the rotor at a rotational speed that is proportional to a frequency of operation of the variable frequency drive; at least one exciter to inject excitation current into the rotor of the more than one generator at any speed of rotation including standstill; and at least one controller, operatively coupled to the at least one variable frequency drive and the at least one exciter, that controls acceleration of the rotor to an operational speed enabling the more than one generator to perform a synchronous condenser operation that includes generating reactive power or absorbing reactive power.

In a third aspect of the present invention, a method for converting a turbine-driven synchronous generator to a synchronous condenser is disclosed. The method comprises: decoupling the synchronous generator from the turbine to form a stand-alone generator having a rotor and a rotor shaft mounted within a stator, the rotor shaft having a first end decoupled from the turbine and a second end opposite the first end; using a variable frequency drive to provide electrical energy to the stator to turn the rotor at a rotational speed that is proportional to a frequency of operation of the variable frequency drive; injecting excitation current into the stand-alone generator at any speed of rotation including standstill; and accelerating the rotational speed of the rotor as a function of the frequency of operation of the variable frequency drive and the injected excitation current to an operational speed enabling the stand-alone generator to act as a synchronous condenser.

DETAILED DESCRIPTION OF THE INVENTION

1 Overall Arrangement

Various embodiments of the present invention are directed to converting a synchronous generator driven by a steam turbine or a gas turbine to a synchronous condenser that can perform a synchronous condenser operation (i.e., generating reactive power or absorbing reactive power). In one embodiment, a generator decoupled from a turbine is used in conjunction with a variable frequency drive and an excitation system. The variable frequency drive provides electrical energy to the stator of the generator to turn the rotor at a rotational speed that is proportional to a frequency of operation of the variable frequency drive. In one embodiment, a transformer connects the variable frequency drive to the generator. The transformer may be a variable frequency drive output transformer or an auxiliary transformer. The excitation system injects an excitation current (e.g., direct current (DC)) into the rotor. A controller, operatively coupled to the variable frequency drive and the excitation system, controls acceleration of the rotor to an operational speed that enables the generator to perform a synchronous condenser operation. In one embodiment, collector rings are disposed on the rotor shaft to receive the excitation current injected by the excitation system. In another embodiment, there is a movement assembly disposed at an end of the rotor shaft that is opposite where the turbine was decoupled. The movement assembly generally comprises a thrust bearing to control axial position of the rotor shaft, a steady rest bearing to control vibration of the rotor shaft, and a turning gear that brings the rotor to an initial speed (e.g., 6 revolutions per minute (rpm)) to facilitate the overall acceleration of the rotor to the operational speed. The movement assembly may be removed from the rotor shaft when it is desirable to connect the generator back to the turbine in order to operate in a power generation mode. In another embodiment, a generator circuit breaker isolates the generator from a power grid as the rotor accelerates towards the operational speed and connects the generator to the power grid upon the rotor reaching the operational speed. In another embodiment, a variable frequency drive disconnect switch disconnects the variable frequency drive from the generator upon the rotor reaching the operational speed.

In another embodiment, it may be desirable to use only some of the components that form the movement assembly or in some instances to not use the movement assembly at all. In particular, in some instances, some or all of the turning gear, thrust bearing, and steady rest bearing may not be needed. For instance, a generator could have a thrust bearing remaining in operation even after being decoupled from a turbine, so no thrust bearing would be needed in this case. Also, the vibration characteristics for the rotor may not require the steady rest bearing, so no steady rest bearing would be needed in this case. Also, the break-away torque to initially start the rotor from standstill may be low, so no turning gear would be needed in this case.

2 Overall Technical Purpose

Technical effects of the various embodiments of the present invention include providing the capability to convert a synchronous generator to perform a synchronous condenser operation with minimal disruption to an existing power plant in such a manner that conversion back to the synchronous generator operation can be accomplished with no additional installation of hardware and minimal expenditure of time and money. Other technical effects associated with the various embodiments of the present invention include obviating the need to use an additional starting motor coupled to the end of the existing rotor shaft in order to bring the rotor to the operational speed.

3 Applicable Instances

The various embodiments of the present invention may be applied to power plants using steam turbine-generators, gas turbine-generators, or other drivers such as hydro turbines. Furthermore, these embodiments may also be applied to steam turbine-generators located in nuclear power plants which typically utilize four magnetic poles. In addition, the embodiments of the present invention can be applied to electrical machines that typically have more than four poles.

4 General Arrangement

Figure 1:
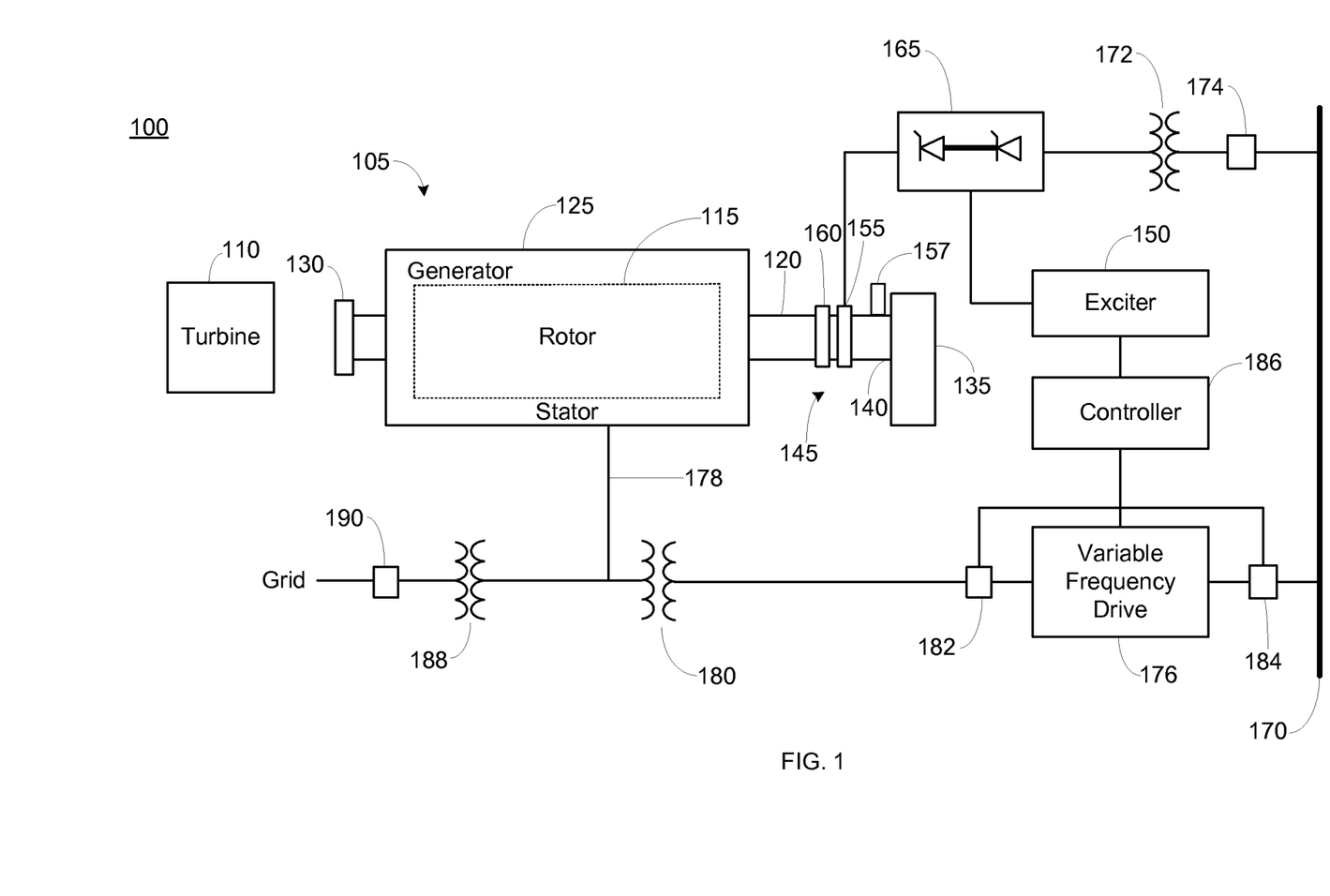
FIG. 1 is a schematic diagram illustrating a synchronous condenser according to one embodiment of the present invention.

Referring to the drawings, FIG. 1 is a schematic diagram illustrating a synchronous condenser 100 according to one embodiment of the present invention. As shown in FIG. 1, synchronous condenser 100 includes a synchronous generator 105 decoupled from a turbine 110. Generator 105 has a rotor 115 and a rotor shaft 120 mounted within a stator 125. Although not illustrated in FIG. 1, rotor 115 is wrapped in field windings, while stator 125 is wrapped in armature windings distributed along its circumference. The field windings of rotor 115 produce a constant magnetic field and interact with the armature windings of stator 125, which are fed by a system of three-phase AC voltages. As shown in FIG. 1, generator 105 has been decoupled from a rotating drive shaft (not shown) of turbine 110 at a turbine coupling end 130 of rotor shaft 120. In one embodiment, generator 105 may be a two-pole, 3600 rpm unit that can spin freely on its existing bearings when disconnected from a turbine such as a steam or gas turbine.

Those skilled in the art will recognize that not all auxiliary systems associated with generator 105 are illustrated in FIG. 1. For example, those skilled in the art will appreciate that generator 105 can have auxiliary systems that typically include a supply of water or other coolants provided to the generator coolers (heat exchangers), a stator winding cooling system, a hydrogen supply and control system for generators using hydrogen as the primary coolant, and bearing lubrication systems.

5 Movement Assembly

In one embodiment, a movement assembly 135 is disposed on rotor shaft 120 at an end 140 opposite turbine coupling end 130 to generally provide support for rotor 115. Movement assembly 135 may comprise a thrust bearing to control axial position of rotor shaft 120, a steady rest bearing to control vibration of rotor shaft 120, and a turning gear that brings rotor 115 to an initial speed to facilitate the overall acceleration of the rotor to an operational speed used to operate in a synchronous condenser mode. In one embodiment, movement assembly 135 is removable, so that generator 105 can be connected back to the drive shaft (not shown) of turbine 110 at turbine coupling end 130 to form a synchronous generator that can operate in a synchronous generation mode. In another embodiment, movement assembly 135 can be disconnected from rotor shaft 120 by removing at least one component between the shaft and the movement assembly, eliminating the need to remove the entire movement assembly. Also, in another embodiment, where turbine 110 will be decommissioned (i.e., not used as a synchronous generator), those skilled in the art will recognize that movement assembly can be placed at turbine coupling end 130. This may be desirable if there is no need for a steady rest bearing on end 140.

Figure 2:
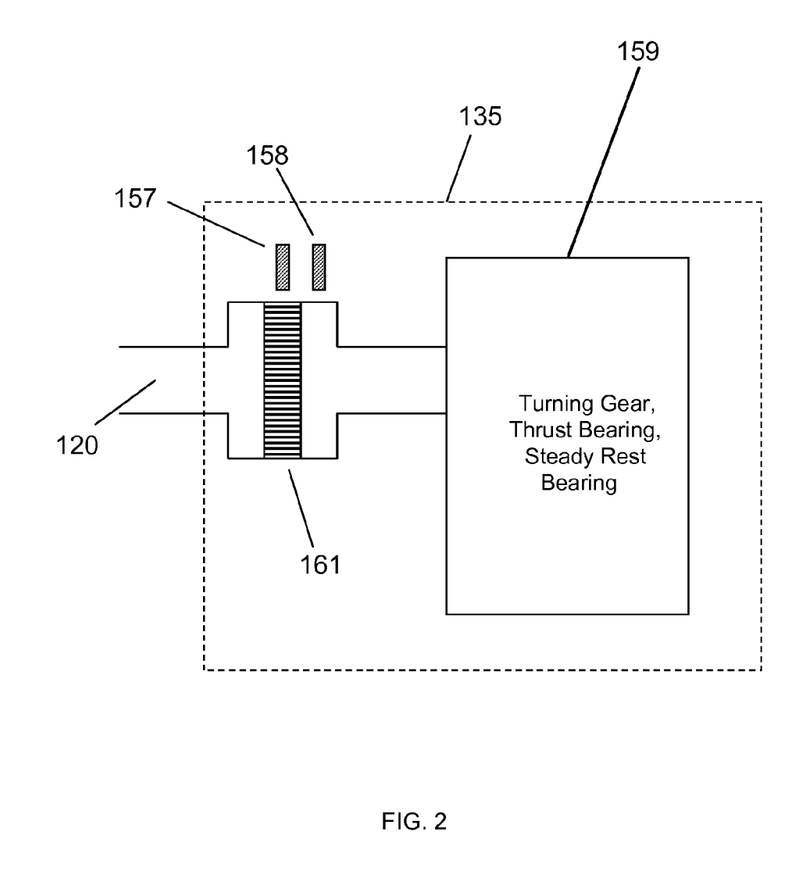
FIG. 2 shows a more detailed view of an alternative embodiment of a movement assembly depicted in FIG. 1.

Those skilled in the art will recognize that movement assembly 135 may comprise components other than the aforementioned thrust bearing, steady rest bearing and turning gear. FIG. 2 shows a more detailed view of an alternative embodiment of movement assembly 135. In addition to a turning gear/thrust bearing/steady rest bearing component 159, there may be a rotor position sensor 158 incorporated into the area of rotor shaft 120 where the bearing and turning gear are installed, to determine the rotor position (rotational angle). In one embodiment, the rotor position obtained from rotor position sensor 158 is used to coordinate the starting of a variable frequency drive 176 (FIG. 1), which is described below in more detail. FIG. 2 also shows that movement assembly 135 may utilize a speed sensor 157 incorporated into the rotor shaft area where the bearing and turning gear are installed. A removable toothed wheel 161 may be located along rotor shaft 120 to provide a signal to speed sensor 157.

Referring back to FIG. 1, those skilled in the art will recognize that assembling and disassembling of movement assembly 135 from rotor shaft 120 to enable generator 105 to operate in the synchronous generation mode or the synchronous condenser mode, can be done with minimal time and cost to the plant in which generator 105 would be located. In addition to assembling or disassembling movement assembly 135 from rotor shaft 120, those skilled in the art would appreciate that certain components (e.g., circuit breakers) and software applications would have to be enabled or disabled depending on which mode of operation was desired for generator 105.

6 Exciter

As shown in FIG. 1, a set of collector rings 145 proximate to end 140 of rotor shaft 120 are configured to receive excitation current (e.g., direct current (DC)) generated from an exciter 150. Collector rings 145 comprise a positive terminal collector ring 155 and a negative terminal collector ring 160. In one embodiment, excitation current is injected in positive terminal collector ring 155 and negative terminal collector ring 160 by a silicon-controlled rectifier (SCR) bridge 165. Embodiments of the present invention are not limited to use of SCR bridge 165. Those skilled in the art will recognize that other types of power electronic bridges can be used to inject the excitation current into collector rings 145. As shown in FIG. 1, SCR bridge 165 is part of exciter 150 that receives an excitation supply and power from an auxiliary power bus 170 (e.g., may provide three-phase current at 50 hertz (Hz) or 60 Hz). Exciter 150 may be any commercially available exciter that can provide an excitation supply used for generating DC power. In one embodiment, exciter 150 may be an EX2100 excitation system provided by the General Electric Company. In some embodiments, those skilled in the art will recognize that it may be desirable to modify exciter 150 to provide an alternate source of excitation in instances where the generator utilizes an alternator as an exciter.

Located between SCR bridge 165 and auxiliary power bus 170 is an excitation transformer 172 that raises or lowers the voltage provided by auxiliary power bus 170 to SCR bridge 165. Supply of the power provided by auxiliary power bus 170 to SCR bridge 165 can be disconnected by a circuit breaker 174.

7 Brushless Exciter

In another embodiment, exciter 150 can take the form of a DC brushless exciter assembly. Often, smaller generators use a brushless exciter instead of an exciter with transformer (e.g., 172). The DC brushless exciter is a small electrical machine that is situated on the end of the rotor shaft so that it can produce alternating current (AC) power. A diode rectifier also located on the rotor shaft would convert the AC power to DC power. Because a DC brushless exciter cannot produce any excitation current at zero speed such as the EX2100 excitation system provided by the General Electric Company, the brushless exciter assembly of this embodiment would utilize a set of auxiliary brushes, collector rings and an auxiliary excitation system that injects direct current into the auxiliary brushes. In one embodiment, the auxiliary excitation system comprises an excitation transformer and power electronics bridge.

Figure 3:
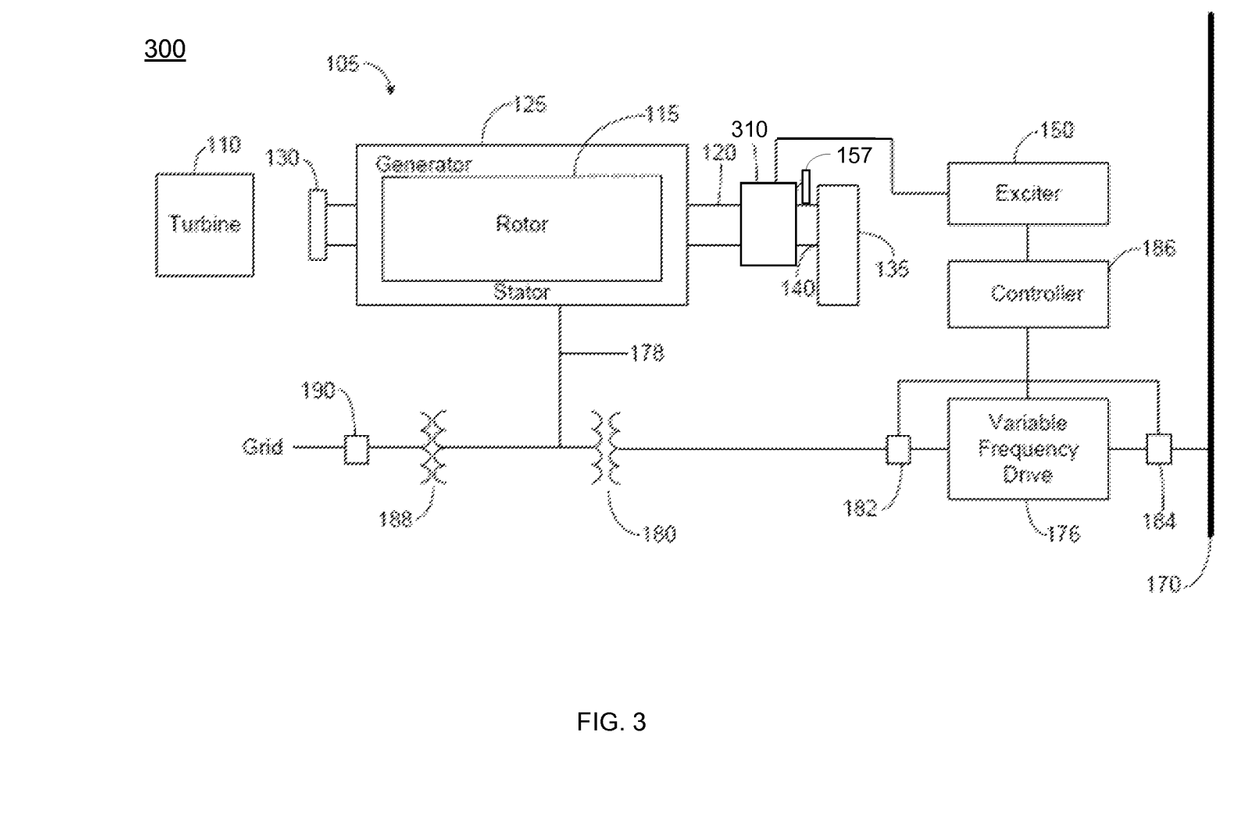
FIG. 3 shows another embodiment of a synchronous condenser in which an alternating current (AC) brushless exciter is used in conjunction with the exciter depicted in FIG. 1.

In another embodiment, exciter 150 can take the form of an AC brushless exciter assembly. In some cases smaller generators use the AC form of the brushless exciter instead of the DC form in order to provide excitation to generator 150 at zero speed. FIG. 3 shows another embodiment of a synchronous condenser 300 in which an AC brushless exciter 310 is used. Note that like elements depicted in FIG. 1 have like descriptions with the elements depicted in FIG. 3 and are not repeated again for description of the embodiment depicted in this figure. As shown in FIG. 3, synchronous condenser 300 does not utilize collection rings 145, SCR bridge 165, excitation transformer 172 and circuit breaker 174.

8 Variable Frequency Drive, Transformer and Disconnect Switch

Referring back to FIG. 1, variable frequency drive 176 provides electrical energy to generator 105 via a generator bus 178. The electrical energy causes rotor 115 to turn at a rotational speed that is proportional to a frequency of operation of variable frequency drive 176. In operation, variable frequency drive 176 provides a variable frequency and variable voltage power signal that provides the accelerating power to generator 105. Variable frequency drive 176 may be any commercially available variable frequency drive that can generate enough electrical power to bring a generator up to operational speed (e.g., 3600 rpms). In one embodiment, variable frequency drive 176 may be of a pulse width modulation type.

As shown in FIG. 1, the electrical energy supplied by variable frequency drive 176 to generator 105 and generator bus 178 is via a transformer 180 and a variable frequency drive disconnect switch 182. Transformer 180 raises the voltage of the electrical energy generated from variable frequency drive 176 to a higher level that is compatible for use with generator 105. In one embodiment, transformer 180 can be an output transformer designed for variable frequency drive 176, or in another embodiment, an auxiliary transformer normally used to energize electrical loads in a plant can be utilized. Using an auxiliary transformer to couple variable frequency drive 176 to generator 105 eliminates design/purchase and installation of a new transformer, as well as minimizes the work needed to be performed on generator bus 178. Those skilled in the art will recognize that transformer 180 is not required in those cases where generator 105 and variable frequency drive 176 generate voltages that are equal or substantially similar.

Variable frequency drive disconnect switch 182 is configured to disconnect variable frequency drive 176 from providing electrical energy to generator 105. In one embodiment, as explained below, variable frequency drive disconnect switch 182 may disconnect variable frequency drive 176 from generator 105 upon rotor 115 reaching the operational speed and synchronizing with the power grid. As shown in FIG. 1, variable frequency drive 176 receives power from auxiliary power bus 170. Supply of the power provided by auxiliary power bus 170 to variable frequency drive 176 can be disconnected by a circuit breaker 184.

9 Controller

A controller 186 is operatively coupled to variable frequency drive 176 and exciter 150. As used herein, having controller 186 operatively coupled to variable frequency drive 176 and exciter 150 can include having controller 186 separately coupled to variable frequency drive 176 and exciter 150 as shown in the figures, integrated within one of the variable frequency drive or exciter, or in each of the variable frequency drive and exciter. Controller 186 is configured to control acceleration of rotor 115 to an operational speed and to synchronize to the power grid, enabling generator 105 to perform a synchronous condenser operation that may include generating reactive power or absorbing reactive power. As will explained below in regard to having generator 105 operate in a synchronous condenser mode, controller 186 is configured to issue a number of commands directing operation of exciter 150 and variable frequency drive 176, as well as operation of disconnect switch 182 and circuit breakers 174, 184 and 190. Controller 186 may be any commercially available controller that can be used to control operations of synchronous machines. In one embodiment, controller 186 may be a MARK VIe controller provided by the General Electric Company.

10 Generator Step-Up Transformer and Breakers

Generator 105 is coupled to the grid to perform the synchronous condenser operations (e.g., generating reactive power, absorbing reactive power and correcting power factor) via a generator step-up transformer 188 and a generator breaker 190. Generator step-up transformer 188 raises the voltage provided by generator 105 from generator bus 178 to a level that is compatible with the power grid. Those skilled in the art will recognize that generator step-up transformer 188 does not always have to be used. Instead, generator bus 178 may be directly connected to other generator buses. However, in this scenario, an isolation circuit breaker would be located between generator 105 and any other generators on that bus. In FIG. 1, generator circuit breaker 190 is used to connect and disconnect synchronous condenser 100 with the power grid. As explained below, generator circuit breaker 190 isolates generator 105 from the power grid as rotor 115 accelerates towards the operational speed and connects generator 105 to the power grid upon rotor 115 reaching the operational speed.

11 Acceleration & Variable Frequency Drive Operation

In another embodiment, variable frequency drive 176 injects a current into the generator 105 via transformer 180 and generator bus 178, and exciter 150 injects a current via SCR bridge 165 and collector rings 145, in order to begin accelerating rotor 115. The control of the current from variable frequency drive 176 may be either in a closed loop mode based on feedback of voltage and current from generator 105 to variable frequency drive 176 (via sensors not illustrated in this figure) or in an open loop mode. In this embodiment, controller 186 controls the injection of excitation current by exciter 150. In particular, controller 186 can control the level of magnetic flux in generator 105 by regulating the excitation field current supplied by SCR bridge 165 at any speed (allowing operation at any selected speed facilitates maintenance, rotor balancing and overspeed trip tests). Note that controller 186 may elect to use a current for full magnetic flux or a reduced current.

12 Location of Generator Breaker

Figure 4:
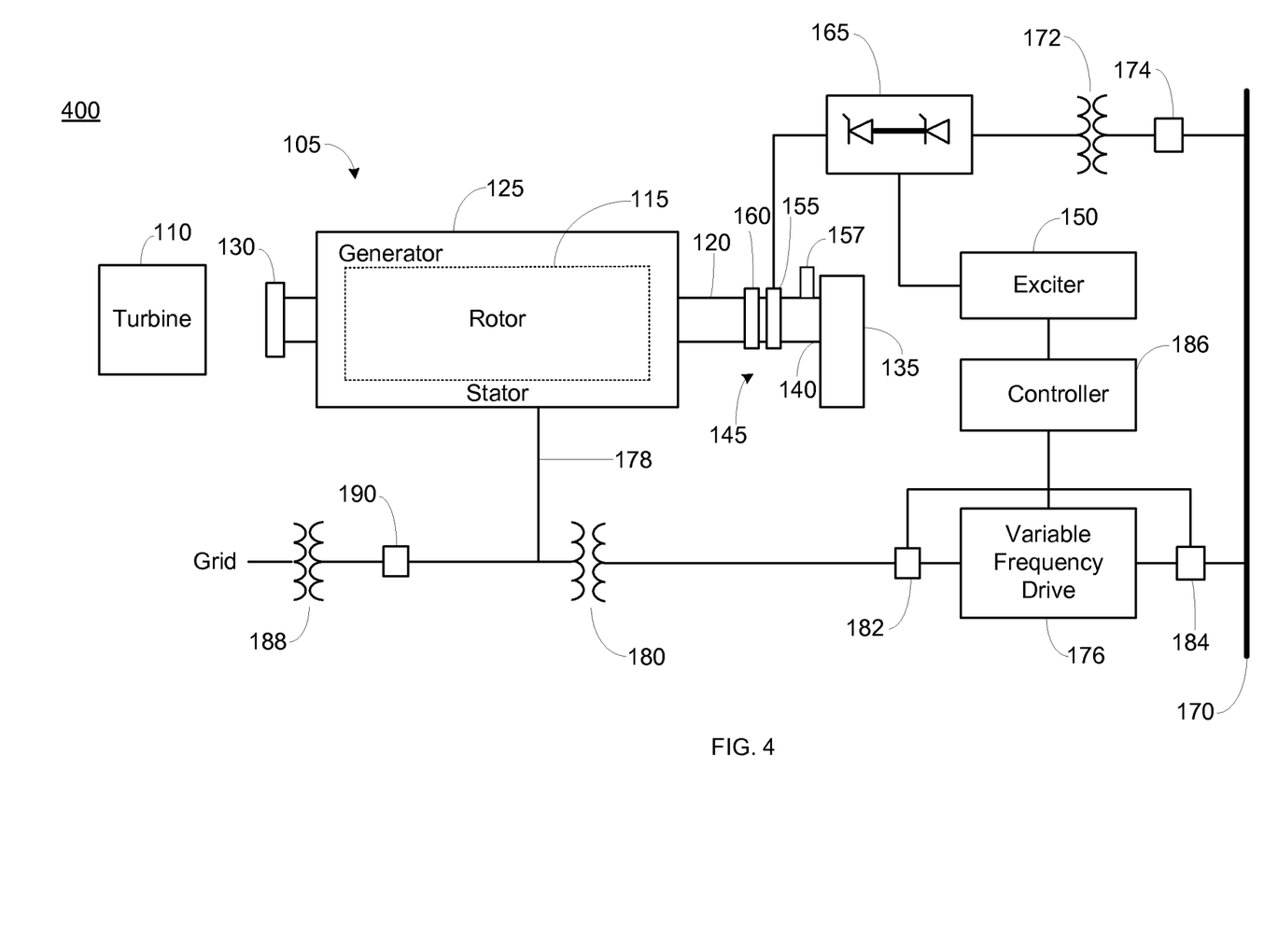
FIG. 4 is a schematic diagram illustrating another alternative embodiment to the synchronous condenser depicted in FIG. 1.

FIG. 4 is a schematic diagram of a synchronous condenser 400 that is an alternative to the embodiment depicted in FIG. 1. Note that like elements depicted in FIGS. 1 and 4 have like descriptions and are not repeated again for description of the embodiment depicted in FIG. 4. Synchronous condenser 400 differs from synchronous condenser 100 of FIG. 1 in that FIG. 4 shows generator circuit breaker 190 located at the low voltage side (right-hand side) of generator step-up transformer 188. In this embodiment, generator circuit breaker 190 will be open during the acceleration sequence in which variable frequency drive 176 accelerates generator 105 from stand-still to turning on of rotor 115, to acceleration to a predetermined rotational speed. This isolates generator step-up transformer 188 from variable frequency drive 176. Isolating generator step-up transformer 188 from variable frequency drive 176 reduces the number of energized pieces of equipment and the power rating required for variable frequency drive 176. Those skilled in the art will recognize that placement of generator circuit breaker 190 will vary with the power plant in which the synchronous condenser is implemented in.

13 Operation (Flow Chart)

Figure 5:
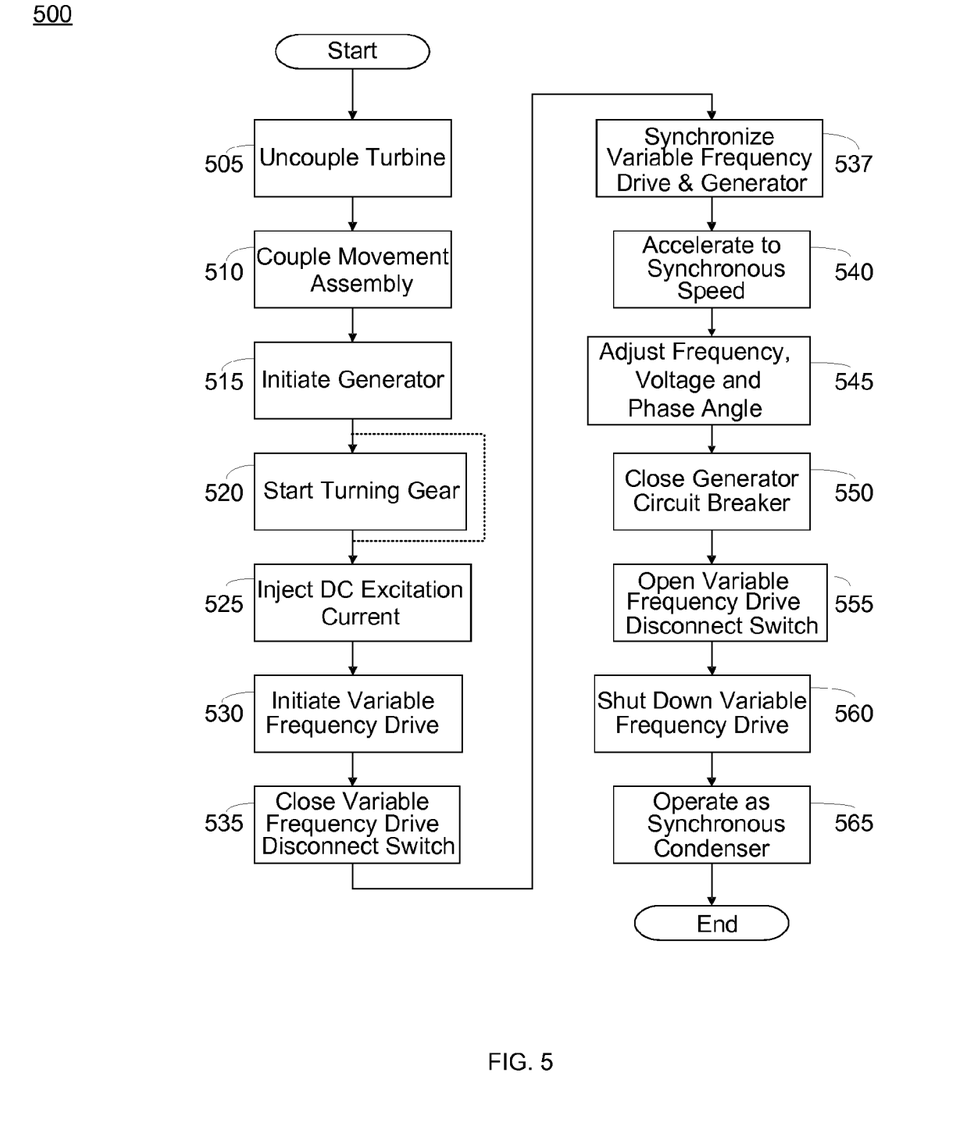
FIG. 5 is a flow chart illustrating the operation of using the synchronous condensers depicted in either FIG. 1, 3 or 4 to perform a synchronous condenser operation according to one embodiment of the present invention.

FIG. 5 is a flow chart 500 illustrating the operation of using the synchronous condensers depicted in FIG. 1, 3 or 4 to perform a synchronous condenser operation according to one embodiment of the present invention. As shown in FIG. 5, the operation to begin using generator 105 as a synchronous condenser starts at 505 where the turbine 110 is disconnected from rotor shaft 120 at turbine coupling end 130, and movement assembly 135 is coupled to end 140 of rotor shaft 120 at 510. Controller 186 then receives a start command from a plant operator at 515 to initiate the generator 105 for use in the synchronous condenser mode of operation. Initiation of the generator 105 involves checking auxiliaries (e.g., lubrication, oil, cooling water, breaker status, etc.) to determine if it is permissible to start generator 105.

13.1 Initial Turning Gear Operation

Once it has been determined that the auxiliaries are operational, then controller 186 turns on the turning gear componentry associated with movement system 135 at 520. This involves controller 186 issuing an initial rotational speed command that causes movement assembly 135 to rotate rotor 115 at a predetermined initial rotational speed (e.g., 6 rpms). During the time that rotor 115 begins to accelerate, controller 186 issues an excitation command to exciter 150 to put an excitation current (e.g., direct current) into rotor 115 at 525 that produces a magnetic field inside generator 105. The combination of the initial rotational speed and the magnetic field initially causes a low voltage (e.g., 25-30 volts) to be generated by generator 105. In one embodiment, if the low voltage signal is at 0.1 Hz, then the initial rotational speed is 6 rpm.

13.2 Variable Frequency Drive Initial Synchronization

In one embodiment, controller 186 then detects an appropriate rotor angular position from rotor position sensor 158 (FIG. 2) and issues a synchronization command to variable frequency drive 176 being initiated at 530. Variable frequency drive 176 closes disconnect switch 182 at 535. The synchronization command causes variable frequency drive 176 to inject current into stator 125 of generator 105 and to increase its frequency from zero at a predetermined rate. By suitable selection of the frequency ramp rate, the current injected into generator 105 by variable frequency drive 176, and the excitation current from exciter 150, generator 105 and variable frequency drive 176 synchronize at 537. In one embodiment, controller 186 can reduce or limit the initial excitation field current provided by exciter 150 in order to accommodate the injection of very low frequency currents into transformer 180 by variable frequency drive 176 during the initial period of the acceleration (e.g., less than 5 seconds).

13.3 Variable Frequency Drive Initial Synchronization—Alternative #1 From Standstill In another embodiment controller 186 can cause exciter 150 to inject excitation current into rotor 115, and variable frequency drive 176 to inject current into generator 105 in order to begin acceleration of rotor 115 from zero speed. In this embodiment, the use of a turning gear would not be required. In this embodiment, process operation 520 would not be utilized. Note that the flow for this embodiment is represented by the dotted line in FIG. 5.

13.4 Variable Frequency Drive Synchronization—Alternative #2

In another embodiment, with rotor 115 operating on turning gear, controller 186 causes exciter 150 to inject excitation current into rotor 115. Controller 186 then issues a synchronization command upon variable frequency drive 176 being initiated at 530 and variable frequency drive disconnect switch 182 being closed at 535. Variable frequency drive 176 senses the voltage generated by generator 105 and begins to inject current into generator 105 at the appropriate time and then begins to ramp up its frequency from zero at a predetermined rate.

13.5 Acceleration to Predetermined Rotational Speed

Once variable frequency drive 176 and generator 105 are synchronized, controller 186 issues an acceleration command at 540 that causes variable frequency drive 176 to increase its frequency, which increases the rotational speed of rotor 115 to a predetermined rotational speed. In particular, once the variable frequency drive and the generator have synchronized, variable frequency drive 176 increases its frequency and voltage according to an acceleration versus time schedule. Thus, at each speed, variable frequency drive 176 will send a request to controller 186 to make a control regarding the excitation supply that is forwarded to exciter 150. Acceleration will cease when the predetermined speed has been reached. In one embodiment, the predetermined speed may be the operational speed (for instance, 3600 rpm for a two-pole generator operating at 60 Hz). However, those skilled in the art will recognize that other operational speeds will depend on the number of magnetic poles in generator 105 and the operating frequency of the power grid. In another embodiment, the predetermined speed may be any speed within the capability of generator 105, in order to perform maintenance activities such as rotor balancing or to test overspeed settings.

13.6 Synchronization To Grid

In one embodiment, once rotor 115 reaches the operational speed, controller 186 issues another synchronization command at 545 to adjust the speed of the rotor 115 and excitation level so the frequency, voltage and phase angle of generator 105 are matched to that of the power grid. In this embodiment, once the frequency, voltage and phase angle of generator 105 are matched to that of the power grid, then generator circuit breaker 190 is closed at 550. Once generator circuit breaker 190 is closed, then variable frequency drive 176 can be disconnected via variable frequency drive disconnect switch 182 at 555 and then de-energized at 560. Then generator 105 may then be operated as a synchronous condenser at 565. Depending on the application, the synchronous condenser mode can then be operated for hours, days or weeks without having to use variable frequency drive 176 to accelerate generator 105 to operational speed. Once the synchronous condenser is shut down, then it can be restarted in the same manner described above with respect to FIG. 5.

13.7 Synchronization To Grid—Alternative #1—Shutdown Variable Frequency Drive & Immediately Close Breaker In another embodiment not fully illustrated in FIG. 5, a different synchronization approach can be used to synchronize generator 105 to the power grid. In this embodiment, once the rotor has reached its operational speed, controller 186 issues commands to adjust the speed of the rotor 115 and excitation level so the frequency, voltage and phase angle of generator 105 are matched to that of the power grid. When the frequency, voltage and phase angle of generator 105 are matched to that of the power grid, then variable frequency drive disconnect switch 182 is opened and generator circuit breaker 190 is closed. The variable frequency drive 176 is then de-energized. Then generator 105 may then be operated as a synchronous condenser.

13.8 Synchronization To Grid—Alternative #2—Coast Down

In yet another embodiment not fully illustrated in FIG. 5, another synchronization approach can be used to synchronize generator 105 to the power grid. In this embodiment, once rotor 115 reaches a predetermined rotational speed greater than the operational speed, controller 186 issues another synchronization command that instructs variable frequency drive 176 to maintain the electrical energy and frequency generated therefrom, in preparation for synchronizing with the power grid for connection thereto. Controller 186 issues a command that causes variable frequency drive 176 to open disconnect switch 182, enabling rotor 115 to decrease from the predetermined rotational speed to the operational speed. Upon reaching operational speed, controller 186 issues a closure command that closes generator circuit breaker 190, enabling generator 105 to connect with the power grid. In addition, controller 186 also issues a variable frequency drive shutdown command.

The foregoing flow chart depicted in FIG. 5 shows some of the operations associated with the synchronous condensers depicted in FIGS. 1 and 3-4. In this regard, each block represents a process act associated with performing these operations. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the operations may be added.

14 Reconfigure As Generator

As noted above, one can reconfigure synchronous condenser 100, 300 and 400 to operate as a synchronous generator. In particular, movement assembly 135 (i.e., thrust bearing, steady rest bearing and turning gear) can be decoupled and generator 105 can be connected back to the drive shaft of turbine 110 at turbine coupling end 130 of rotor shaft 120. This would also necessitate rearranging some lubrication, piping, etc., and enabling/disabling certain software applications in order to operate in a synchronous generation mode.

15 Multiple Generators Cross Connected

Figure 6:
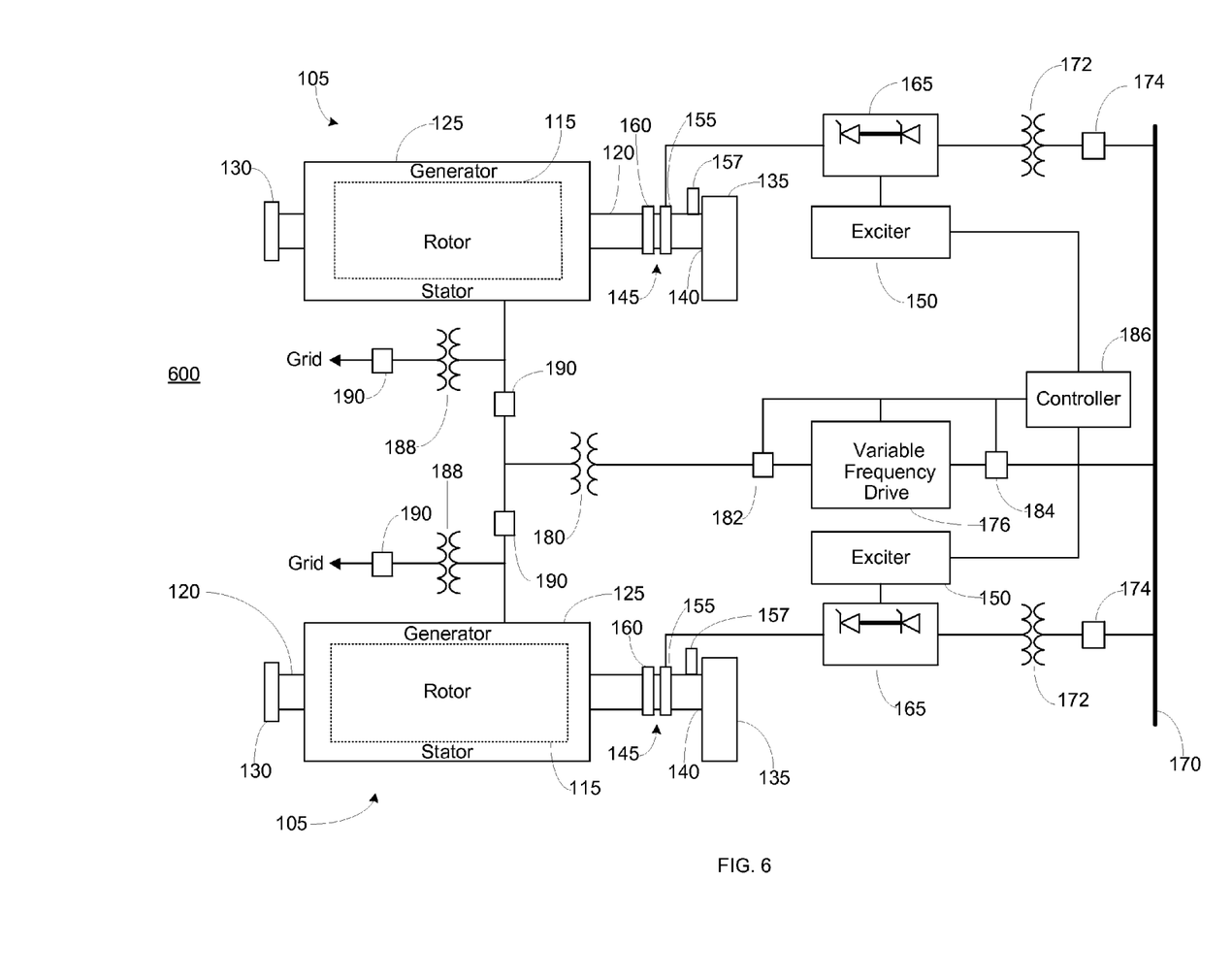
FIG. 6 is a schematic diagram illustrating a synchronous condenser according to another embodiment of the present invention.

FIG. 6 is a schematic diagram illustrating a synchronous condenser 600 according to another embodiment of the present invention. Note that like elements depicted in FIGS. 1, 3-4 have like descriptions with the elements depicted in FIG. 6 and are not repeated again for description of the embodiment depicted in this figure. In FIG. 6, synchronous condenser 600 comprises more than one generator 105 with respective collector rings 145 and movement assembly 135 that is started by variable frequency drive 176 and a respective excitation system (exciter 150, SCR bridge 165, and excitation transformer 172). In this embodiment, controller 186 controls operation of the excitation system and variable frequency drive 176, as well as variable frequency drive disconnect switch 182 and circuit breakers 174, 184 and 190. Those skilled in the art will recognize that in this embodiment, variable frequency drive 176 would start one generator 105 and then the other. Furthermore, those skilled in the art will recognize that additional generators 105 than what are illustrated in FIG. 6 can be utilized. In addition, those skilled in the art will recognize in this embodiment that controller 186 would be modified to recognize the presence of multiple generators 105. Also, those skilled in the art will recognize that many other topologies of FIG. 6 may be utilized than what is shown in this figure. For example, there may be various combinations of one or more controllers, exciters, and variable frequency drives utilized in a possible implementation of the condenser illustrated in FIG. 6.

16 Controller Embodiments

In various embodiments of the present invention, portions of controller 186 can be implemented in the form of an entirely hardware embodiment, an entirely software embodiment or an embodiment containing both hardware and software elements. In one embodiment, the processing functions performed by controller 186 may be implemented in software, which includes but is not limited to firmware, resident software, microcode, etc.

Furthermore, the processing functions performed by controller 186 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk.

Current examples of optical disks include a compact disk—read only memory (CD-ROM), a compact disk—read/write (CD-R/W) and a digital video disc (DVD).

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A synchronous condenser, comprising:
a synchronous generator decoupled from a turbine, the generator having a rotor and a rotor shaft mounted within a stator;
a movement assembly disposed at one end of the rotor shaft to rotate the rotor at a predetermined initial rotational speed;
a rotor position sensor to indicate a rotor position of the rotor;
a variable frequency drive that provides electrical energy to the stator that turns the rotor at a rotational speed that is proportional to a frequency of operation of the variable frequency drive;
a transformer coupled to the variable frequency drive and the synchronous generator that transfers electrical energy from the variable frequency drive to the stator;
an exciter that facilitates injection of excitation current into the rotor at any speed of rotation including standstill; and
a controller, operatively coupled to the movement assembly, the rotor position sensor, the variable frequency drive and the exciter, that controls acceleration of the rotor from standstill to an operational speed, wherein the controller coordinates control of an initial acceleration of the rotor as a function of the rotor position of the rotor detected by the rotor position sensor, wherein the controller directs the variable frequency drive to inject very low frequency currents through the transformer to the stator in response to the rotor position sensor detecting a predetermined rotor angular position.

2. The synchronous condenser of claim 1, wherein the movement assembly comprises a thrust bearing to control an axial position of the rotor shaft.

3. The synchronous condenser of claim 1, wherein the movement assembly comprises a steady rest bearing to control vibration of the rotor shaft.

4. The synchronous condenser of claim 1, wherein the movement assembly comprises a turning gear that brings the rotor to the predetermined initial rotational speed to facilitate acceleration of the rotor to the operational speed.

5. The synchronous condenser of claim 1, wherein the movement assembly comprises a speed sensor to provide a speed signal for the controller.

6. A method comprising:
decoupling a synchronous generator from a turbine to form a stand-alone generator having a rotor and a rotor shaft mounted within a stator;
injecting a first level of excitation current into the rotor at any speed of rotation including standstill;
establishing an initial speed of rotation of the rotor;
detecting an angular position of the rotor;
using a variable frequency drive to inject current into the stator via a transformer, wherein the using of the variable frequency drive to inject current into the stator is coordinated as a function of the detected angular position of the rotor; and
increasing a frequency of the injected current from the variable frequency drive into the stator from a first frequency to an operational frequency, thereby accelerating the rotor as a function of the frequency of operation of the variable frequency drive.

7. The method according to claim 6, wherein the frequency of the injected current from the variable frequency drive into the stator is increased to accelerate the rotor to a predetermined operational speed.

8. The method according to claim 6, further comprising selecting the first level of excitation current into the rotor to accommodate injection of very low frequency currents into the transformer by the variable frequency drive during an initial period of accelerating the rotor.

9. The method according to claim 6, wherein the variable frequency drive injects a selected level of current into the stator as a function of a selected frequency ramp rate.

10. The method according to claim 6, further comprising increasing the excitation current to a second level after a predetermined period of time.

11. The synchronous condenser of claim 1, wherein the frequency of the injected current from the variable frequency drive to the stator is increased to accelerate the rotor to a predetermined operational speed.

12. The synchronous condenser of claim 1, wherein the variable frequency drive injects a selected level of current to the stator as a function of a selected frequency ramp rate.

13. The synchronous condenser of claim 1, wherein the controller issues a plurality of commands while controlling acceleration of the rotor from standstill to an operational speed.

14. The synchronous condenser of claim 13, wherein one of the plurality of commands comprises an excitation current injection command that causes the exciter to inject a first level of excitation current into the rotor at any speed of rotation including standstill.

15. The synchronous condenser of claim 14, wherein one of the plurality of commands comprises an excitation current command that causes the exciter to establish the first level of excitation current into the rotor to accommodate the very low frequency currents injected from the variable frequency drive through the transformer into the stator during an initial period of accelerating the rotor.

16. The synchronous condenser of claim 14, wherein one of the plurality of commands comprises an excitation current increase command that causes the exciter to increase the excitation current to a second level after a predetermined period of time.

17. The synchronous condenser of claim 13, wherein one of the plurality of commands comprises an initial rotational speed command that causes the movement assembly to establish the predetermined initial rotational speed for the rotor.

18. The synchronous condenser of claim 13, wherein one of the plurality of commands comprises a rotor position monitoring command that causes the rotor position sensor to detect the angular position of the rotor.

19. The synchronous condenser of claim 13, wherein one of the plurality of commands comprises a variable frequency drive current injection command that causes the variable frequency drive to inject current into the stator via the transformer.

20. The synchronous condenser of claim 13, wherein one of the plurality of commands comprises an acceleration command that causes the variable frequency drive to increase a frequency of the current injected therefrom into the stator from a first frequency to an operational frequency, thereby accelerating the rotor as a function of the frequency of operation of the variable frequency drive.

* * * * *